Nov. 15, 1955     H. W. COLLINS     2,723,705
METHOD AND APPARATUS FOR MAKING REINFORCED PLASTIC LAMINATES
Filed July 21, 1950     3 Sheets-Sheet 1

INVENTOR:
HOWARD W. COLLINS.
BY
*Staelin & Overman*
ATTYS.

Nov. 15, 1955  H. W. COLLINS  2,723,705
METHOD AND APPARATUS FOR MAKING REINFORCED PLASTIC LAMINATES
Filed July 21, 1950  3 Sheets-Sheet 2
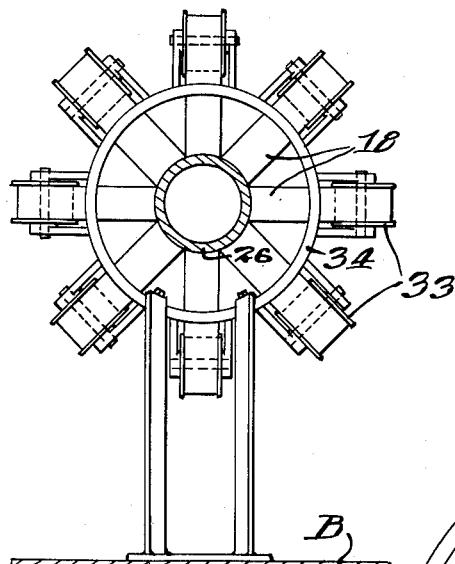
FIG-2-
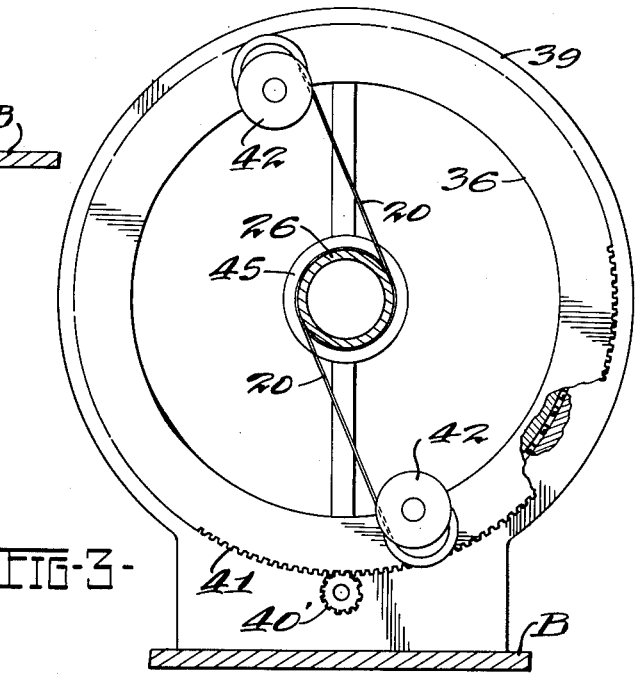
FIG-3-
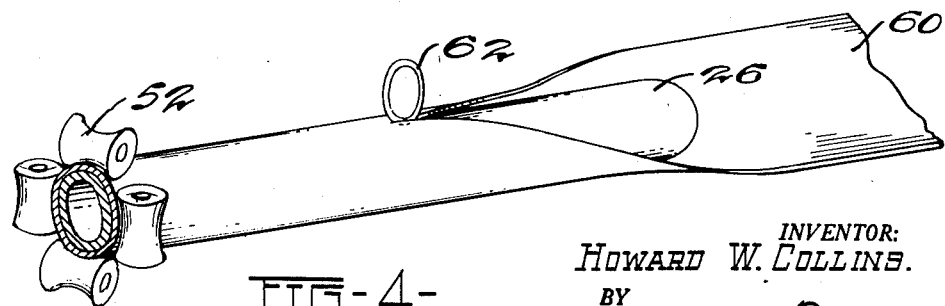
FIG-4-
INVENTOR:
HOWARD W. COLLINS.
BY
ATTYS.

Nov. 15, 1955 H. W. COLLINS 2,723,705
METHOD AND APPARATUS FOR MAKING REINFORCED PLASTIC LAMINATES
Filed July 21, 1950 3 Sheets-Sheet 3
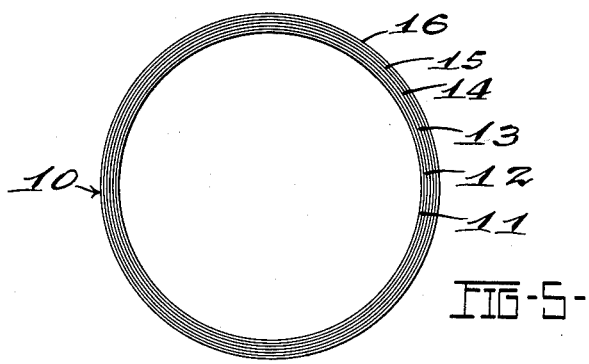
FIG-5-
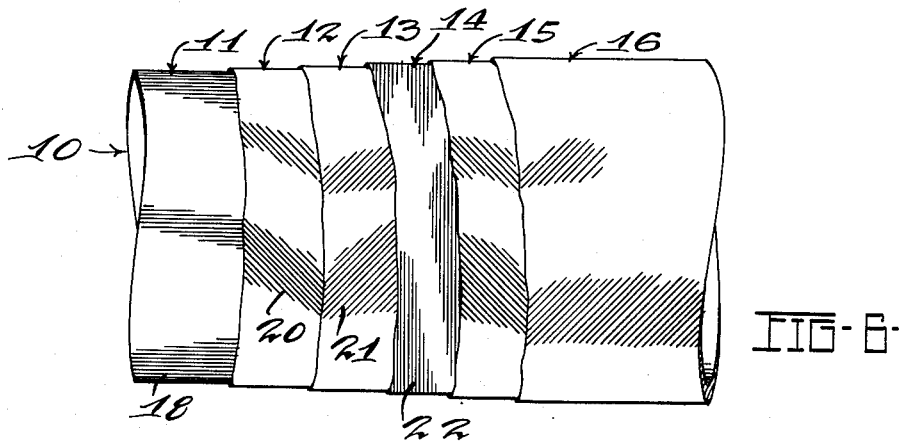
FIG-6-
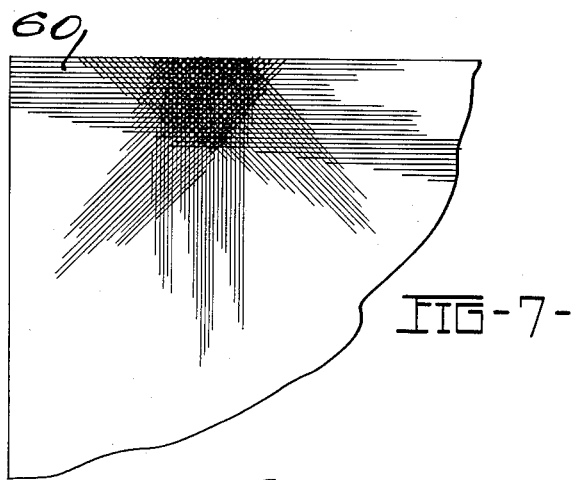
FIG-7-
INVENTOR:
HOWARD W. COLLINS.
BY
Staehli & Obermann
ATTYS.

United States Patent Office 2,723,705
Patented Nov. 15, 1955

2,723,705

METHOD AND APPARATUS FOR MAKING REINFORCED PLASTIC LAMINATES

Howard W. Collins, Newark, Ohio, assignor to Owens-Corning Fiberglas Corporation, a corporation of Delaware Application July 21, 1950, Serial No. 175,139

10 Claims. (Cl. 154—1.7)

This invention relates to reinforced plastics and more particularly to an improved method and apparatus for producing plastic reinforcements especially in tubing and sheet form.

One of the objects of this invention is to provide a reinforced plastic or a plastic laminate having an exceptionally high strength-weight ratio and capable of being economically manufactured in tubular form or in sheet form when desired.

Another object of this invention is to improve generally fabricating techniques so that plastic laminates having the required strength characteristics may be produced more economically at an increased rate of production with less equipment.

Still another object of this invention is to provide a plastic reinforced with unwoven fibers, and more particularly unwoven glass fibers, predeterminedly arranged to afford the optimum strength in the directions required for the particular use to which the plastic article is to be put.

A further object of this invention is to provide a fabricating technique which enables reinforcing plastics with a high concentration of substantially continuous glass fibers in which the glass fibers are in the form of warps or sheets of parallelly arranged filaments, strands or yarns oriented to obtain optimum glass-to-resin ratios and to provide exceptional strength characteristics without the use of woven glass cloths. As a result, the cost of weaving and the expensive equipment required for this purpose may be eliminated.

A still further object of this invention is to provide a tube of plastic or resin and that may have a relatively thin wall while having substantial strength in both compression and tension and a high resistance to twisting. This is accomplished by reinforcing the tube with successive wrappings of glass fiber warps distributed around the tube with the fibers of the different warps extending in directions providing the requisite strengths in all directions, the fibers forming the warps being continuous throughout the length of the reinforced tube.

In addition to the foregoing, the present invention has as an object a sheet for the manufacture of plastic laminates that is reinforced in several different selected directions by glass fiber warps. This feature, as well as the foregoing and other objects, will be made more apparent as this description proceeds, especially when considered in connection with the accompanying drawings, wherein:

Figure 2 is a vertical sectional view taken along line 2—2 of Figure 1;

Figure 3 is a similar view taken along line 3—3 of Figure 1;

Figure 4 is a perspective view of a modification of the invention illustrating the formation of a laminated sheet;

Figure 5 is a cross-sectional view on exaggerated scale through a reinforced plastic tube fabricated by the apparatus shown in Figure 1;

Figure 6 is a fragmentary elevational view of a length of reinforced tubing and illustrating the general fiber distribution diagrammatically; and Figure 7 is an exaggerated elevational view of a sheet of reinforced plastic laminate formed in accordance with the invention as illustrated in Figure 4.

Figure 1:
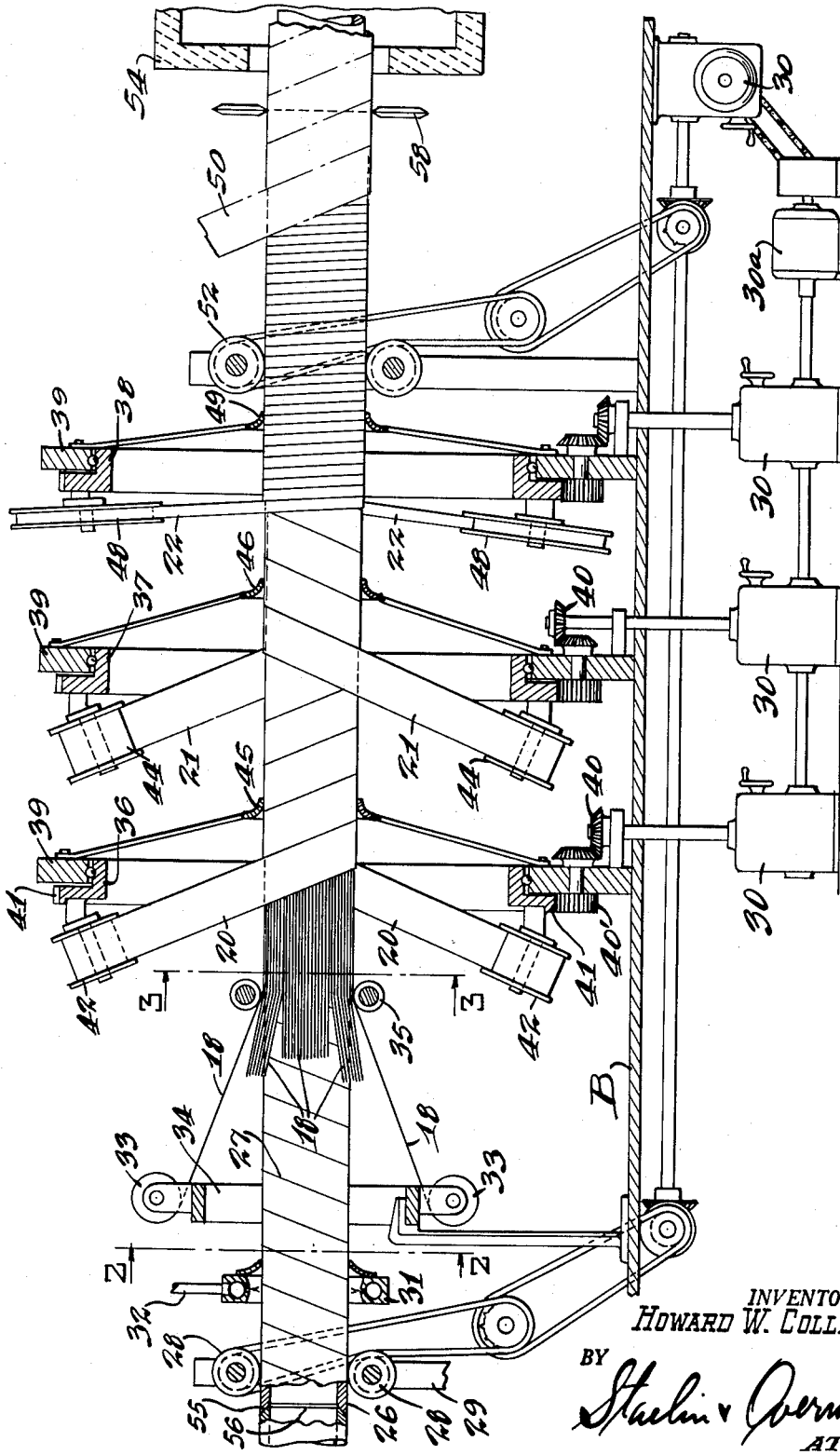
Figure 1 is a semi-diagrammatic side elevational view of one type of apparatus for producing reinforced plastic laminates in accordance with this invention.

In Figure 6 of the drawing, I have illustrated a reinforced plastic tubing 10 comprising a resinous material reinforced with unwoven glass fibers. Either high or low pressure curing laminating resins may be satisfactorily used in forming the laminate and the particular resin employed depends largely upon the use to which the laminate is to be put. Several examples of low or contact pressure thermosetting resins capable of producing satisfactory results may consist of polymers and copolymers from such groups as allyl compounds and their derivatives, polyester resins, styrene derivatives, or acrylic acid and ester derivatives, all having sufficient reactive groups to form a cross-linkage responsible for the thermosetting properties. In the event it is desired to use relatively high pressure thermosetting resins, satisfactory results may be obtained by employing the reaction products of phenol, urea, melamine, cresylic acid or resorcinol with formaldehyde, furfuraldehyde, or other aldehydes, which resins are ordinarily applied as a partially reacted resin in a solution, emulsion or dispersion in suitable vehicles.

Although numerous different types of fibrous material may be used to reinforce the resin or plastic, nevertheless, glass fibers are preferred. Glass fibers may be economically produced in substantially continuous lengths at microscopic diameters. This not only enables having the fibers extend continuously throughout the length or width of the laminate but, in addition, enables obtaining a very high concentration of fibers in the resin. The warp fibers are preferably present in the form of untwisted strands or bundles but may also be twisted yarns or other forms by which a dense sheet may be obtained. Thus, the optimum glass-to-resin ratios may be secured for the particular application of the plastic laminate or tube.

The warps of continuous type fibers may be formed by various methods well known in the textile industry. One method suitable for producing the flat continuous sheets or ribbons includes assembling a multiplicity of untwisted glass fiber strands on a warping reel and withdrawing the desired number to form a ribbon of the desired width and thickness. The assembled strands are then preferably dipped or coated with an adhesive to maintain the parallel relation of the fibers during subsequent handling. The adhesive may be the ultimate laminating resin which may be present in amounts of 15% to 30% by weight of the glass thus necessitating the addition of little or no resin during the laminating operation. The coated sheet or ribbon is then wound onto suitable spools or reels for use in the laminating machine as will become apparent presently. The warp ribbons are preferably produced in minimum width and thickness to facilitate handling and control during the laminating.

The tube 10 is formed of a plurality of layers of glass fibers arranged in sheets or warps of parallelly related fibers that are arranged so that the fibers in one layer extend at selected angle to the fibers in an adjacent layer. This arrangement imparts substantial strength to the laminate in the general directions of the fibers and is capable of wide variations so that the strength properties of the laminate may be controlled to suit different conditions. It has been found that to provide a 2 to 1 strength ratio of diameter to length in a tube the lead or lay of the fibers spiralling around the tube should be at an angle of approximately 67½ degrees to the axis of the tube.

The resistance to twisting may be increased by decreasing the lead angle so that the fibers lie more nearly transverse to the tube axis. In any case, the layers or warps are exceptionally thin, say 10 to 20 mils, so that even though the laminate is cross laminated with a substantial number of layers to afford maximum strength, the ultimate thickness of the laminate is relatively thin and light in weight.

For the purpose of illustration, the tubular plastic laminate 10 shown on an exaggerated scale in Figures 5 and 6 of the drawings, comprises six laminations indicated by the reference characters 11 to 16 inclusive. The layer or lamination 11 is made up of warps 18 and comprises glass fibers distributed around the periphery of the tubing 10 and extending substantially in parallel relationship one to another and also parallel to the axis of the tubing for the full length of the latter. The layers 12 and 13 are formed, respectively, of sheets or warps 20 and 21 and comprise parallelly arranged glass fibers extending spirally around the layer 11 with the fibers in the warp layer 13 crossing at an acute angle the fibers in the layer 12.

The layer 14 is formed by one or more warps 22 and comprises parallelly arranged glass fibers extending around the layer 13 at an angle to the fibers in the layers 11, 12 and 13 and related at approximately a right angle to the axis of the tube. The layers 15 and 16 are, respectively, formed of parallelly related fibers extending spirally around the layer 14 with the fibers in the layer 15 extending at an angle to the fibers in the layer 16 and with the fibers in both layers angularly related to the fibers in the layers 11, 12, 13, 14 and 15. A greater or lesser number of layers of glass fiber warps may be provided and the warps may be oriented or arranged so that the fibers extend in practically any specified direction, depending upon the strength characteristics required. In any event, the glass-to-resin ratio is such as to assure obtaining the maximum strength. To this end the composite product is made up preferably of about 30% to 50% of fibrous glass by weight and the fibers or strands extend continuously throughout the length of the spiral layers.

One method of fabricating the present product will be more fully understood upon reference to Figure 1 of the drawing, wherein one form of apparatus is shown for carrying out the several steps of the method. In detail, the numeral 26 indicates a mandrel comprising an elongated tube having a protective covering 27 such, for example, as cellophane or polyvinyl alcohol film to prevent resin from adhering to the mandrel. The mandrel is supported by coacting rolls 28 on a frame 29 secured to a base plate B. Movement is imparted to the rolls by suitable gearing connected to one of a series of power transmissions 30 which may receive power in a conventional manner from a motor 39a. The rolls 28 move the mandrel in the direction of its axis and a coating of the selected plastic resin is applied thereto during advancement by an applicator 31. The applicator 31 is in the form of an annular chamber supported in the path of travel of the mandrel for receiving the latter and having an annular series of openings in the inner wall thereof through which the resin in the chamber flows. The resin is supplied under pressure to the chamber through a conduit 32 leading from a pressure pump (not shown) and spread around the periphery of the mandrel by the applicator as the mandrel is advanced relative to the latter. The warps of fibers may advantageously carry a full complement of resin in a dry or partially cured non-tacky state so that a later application of resin is unnecessary to provide a completely impregnated body.

The layer 11 (Figure 6) is made up of two or more warps 18 carried by supply spools 33 spaced uniformly about the axis of the mandrel 26 on a circular frame 34. The frame is suitably supported on the base B to maintain the warps 18 concentrically positioned with respect to the axis of the mandrel. The warps 18 may have a width equal to one-half the circumference of the mandrel or in the case of large diameter tubes, a plurality of warps having a combined width totalling the circumference of the mandrel may be employed.

As previously stated, the warps comprise glass fibers of substantially continuous length and the width of each warp where two are employed preferably approximate one-half the circumference of the mandrel 26. The free ends of the fibers in one warp 18 are distributed around the upper half of the mandrel 26 and the free ends of the fibers in the other warp are distributed around the lower half of the mandrel. In fabricating tubes of larger diameter a suitable number of warps 18 may be employed as shown in Figure 1. The fibers are attached to the mandrel by the resin previously applied by the applicator 29 so that movement of the mandrel along its path of travel effects a corresponding movement of the warps and unwinds the latter from their respective reels or spools. The individual fibers or strands comprising the warps may be guided to the periphery of the mandrel by a suitable reed 35 fixed against movement with the mandrel and supported in advance of the reels. The reed 35 may be formed of a coil spring having the ends connected, thus providing a uniform spacing by passing the fibers between the coils. These warps cooperate with each other to form the inner layer or lamination 11 of the finished laminate 10 and the voids or spaces between adjacent glass fibers in the warps are filled with the plastic or resin coating on the mandrel 26.

As advancement of the mandrel continues, one or more additional warps are wrapped around the layer 11 or warps 18 by winders in the form of rotatable rings respectively numbered 36, 37 and 38 supported on a frame 39 for rotation about the axis of the mandrel 26. For purposes of illustration the winders 36 and 38 may be assumed to rotate in a counterclockwise direction when viewed in the direction of travel of the mandrel and the winder 37 rotates in a clockwise direction. The winders are driven by means of gearing indicated generally at 40 connected to the power transmission 30 and including spur gears 40 meshing with gear teeth 41 formed on the winder rings. The transmissions 30 are preferably of such construction that independently controllable sources of power are provided for supplying the several rotatable elements.

In the present instance, two warps 20 and 21 are wrapped around the mandrel 26 to form the layers 12 and 13 (Figure 6). The warp 20 is carried by a reel or spool 42 on the winder 36 and the warp 21 is carried by a reel or spool 44 on the winder 37. As shown in Figure 1 each warp 20 and 21 is formed of complementary ribbons each measuring one-half of the required width. Narrow widths of warp are more economically produced and handled during wrapping than wide warps and the tension thereon may be more readily controlled. The width of the warp is regulated by the desired lay of the warp in relation to the axis of the mandrel and this also regulates the speed of travel of the mandrel with respect to the rotary speed of the winder. The spools are respectively supported for rotation on the winders with the axes of the spools substantially in a common plane with the axis of the mandrel 26 and inclined with respect to the mandrel axis to enable spirally wrapping the warps 20 and 21 around the layer 11 or warps 18. The speed of rotation of the winder and the rate of advancement of the mandrel are predetermined, so that during one complete revolution of the winder, the mandrel is advanced a distance approximating the width of the combined warps. As a result, the warps 20 and 21 form closed spirals around the mandrel with the fibers in the warp 20 extending at an angle to the fibers in the warp 21. The warps 20 and 21 are wrapped tightly around the layer 11 formed by the warps 18, so that the resin or plastic on the periphery of the mandrel is forced between the fibers of all of the warps to fill the spaces or voids therebetween. This operation may be facilitated by squeegees in the form of rings 45 and 46 of yieldable material positioned in advance of the winders 36 and 37 for engaging the warps 20 and 21 as the latter are wrapped around the mandrel.

A third winder 38 supported for rotation in a counterclockwise direction around the axis of the mandrel is adapted to wrap the layer 14 around the mandrel. As shown in Figure 1 the layer 14 is produced by complemented warp ribbons 22 carried on spools 48 on the winder 38 and disposed at diametrically opposite sides of the mandrel for rotation about the mandrel axis. The axes of the spools 48 carrying the warp 22 are substantially parallel to the axis of the mandrel, so that the fibers in this warp not only extend approximately perpendicular to the fibers in the warp 18, but also lie at an angle to the fibers in the warps 20 and 21. The winder 38 is rotated independently at a suitable speed, so that the narrow warp 22 is wound in closed spirals around the mandrel 26 as the latter is advanced along its path of travel. The warp 22 is squeezed against the next adjacent layer of fibers by a squeegee 49 and the resin also fills the voids or spaces between the fibers in these warps.

In describing the foregoing, particular stress has been placed on the fact that three winders are provided and that two complemental warps of long glass fibers or strands are carried by each winder to form the layers 12, 13 and 14. This arrangement is highly variable and depends on the strength characteristics required in the finished laminate 10. Figure 1 illustrates what may be termed a basic arrangement for producing a laminate comprising four layers. Additional layers such as indicated at 15 and 16 in Figure 6 may be provided by duplicating the winders 36 and 37 or 38 in any desired number. Reinforcing material other than the glass fiber strand, such as for instance, metallic wire, etc., may be wrapped around the mandrel by appropriately adapting the winder structure for such operations. Some installations may require increasing the number or thickness of the layers or laminations and this may be accomplished by adding additional warp beams to the winders and/or duplicating the winders.

In the production of tubing it may be found desirable to apply a wrapping of cellophane indicated at 50 to the wrapped mandrel to assure holding the layers in compact relation while the resin is cured. The wrapping produces a smooth surface and prevents marring the surface while the resin is still in a plastic state.

Regardless of the number of layers or laminations applied to the mandrel the latter is advanced between the supporting and driving rolls 52 into a heating chamber 54 and the resin is cured or polymerized to form an integral, light weight tube possessing exceptionally high strength. A length of this tube is shown in Figure 6 of the drawing and the fiber arrangement is considerably exaggerated in an attempt to illustrate the directional trend of the fibers which results from cross-laminating the warps in the manner previously described. Owing to the fact that the mandrel 26 may be formed of a yieldable material and due to the fact that the mandrel is protected from the resin or plastic by the cellophane wrapping 27, it is a relatively simple matter to strip the laminate 10 from the mandrel.

The mandrel structure, however, is subject to various modifications. It is preferred in the interest of simplifying the operation to form the mandrel in sections of nominal length say ten to twenty feet, or more if found desirable. The mandrel and particularly the larger diameters may be readily formed by well known centrifugal casting processes from low melting point lead or suitable alloys. The mandrels may also be formed by extrusion processes also well known in the art. The melting point of the metal may be critically controlled to withstand the curing temperature of the resin but will melt readily and flow from the tube at a temperature below that at which the laminate would be injured.

The mandrel section may be formed at one end to provide a bevelled shoulder 55 and at the other end with a matching cone shaped portion 56 as shown in Figure 1. As each section of the mandrel is covered it may be separated at the juncture with the succeeding mandrel by cutting means indicated at 58 thus permitting separately curing each length of tubing. This is particularly advantageous when it is desired to mold or otherwise specially form the ends of the pipe for couplings or other connections.

A sheet of glass fiber reinforced laminate 60 of the general type shown in Figure 7 of the drawing may be produced by the above process by merely slitting the reinforced plastic tube in the direction of its length by a cutter 62. This is shown in Figure 4 which illustrates the covered mandrel 26 supported by the rolls 52 and the plastic sheet spread open to remove it from the mandrel. The cutter is in the form of a disc supported for rotation about an axis perpendicular to the tube axis and operates to slit the tube as the mandrel is advanced along its path of travel. The tube may be slit before or after the curing operation, or provision may be made for only partially curing the resin before the tube is introduced to the slitter. One advantage of slitting the tube before the resin is thoroughly set is that it permits sufficient relative shifting movement of the fiber reinforcing layers to form a flat sheet when the slit tube is spread out. The resin may then be cured in accordance with conventional practice to provide a relatively thin plastic laminate reinforced by glass fibers arranged in layers with the fibers in adjacent layers extending in different directions. Sheets made in this manner may also be laminated together or otherwise molded before curing to form shaped articles. The directional trend of the fibers is diagrammatically illustrated in Figure 7 of the drawing on an exaggerated scale and is predetermined to impart substantial strength to the laminate in the required directions.

Transparent tubes and sheets may be produced by employing glass fibers and resins having substantially the same indices of refraction as disclosed in Patent 2,311,613, to Games Slayter, dated February 16, 1943.

Modifications may be resorted to without departing from the spirit of the invention or the scope of the appended claims.

I claim:

1. A continuous method of making reinforced resin laminates, comprising grouping individual fibers of reinforcing material around a mandrel with the fibers extending longitudinally of the mandrel, simultaneously spirally winding a warp of fibers of reinforcing material over the longitudinally extending fibers on said mandrel, and securing the fibers together with a resinous binding agent.

2. A continuous method of making reinforced resin laminates, comprising grouping individual fibers of reinforcing material around the periphery of a mandrel with the fibers extending longitudinally of the mandrel, simultaneously spirally winding a warp of fibers of reinforcing material over the longitudinally extending fibers on said mandrel, securing the fibers together with a resinous binding agent, and slitting the fiber layers in the general direction of the axis of the mandrel to form a sheet.

3. A continuous method of making reinforced resin laminates comprising grouping individual glass fibers of substantial length around the periphery of a mandrel with the fibers extending longitudinally of the mandrel, advancing the mandrel with the longitudinally extending fibers thereon in the direction of the axis of the mandrel, simultaneously spirally winding warps of glass fibers in opposite directions around the mandrel during advancement of said mandrel to form superposed layers of glass fibers over the longitudinally extending fibers, the fibers in said superposed layers extending in different directions, and securing the fibers together with a heat activatable resin.

4. A continuous method of making reinforced resin laminates, comprising arranging fibrous glass on a mandrel with individual fibers of substantial length extending in the general direction of length of the mandrel, simultaneously spirally winding a warp of fibers of reinforcing material around the fibrous glass on said mandrel to form superposed layers of fibers with the fibers in adjacent layers extending in different directions, and securing the fibers one to another with a resinous material.

5. A continuous method of making reinforced resin tubing, comprising applying a resinous binder on the periphery of an elongated cylindrical member, attaching the ends of a multiplicity of long fibers to the periphery of said cylindrical member to form a sleeve of long longitudinally extending fibers around the member, spirally winding reinforcing fibers around the sleeve of fibers and polymerizing the resinous binder to secure the fibers together.

6. Apparatus for forming reinforced resin laminates, comprising an elongated cylindrical member, spools containing warps of long reinforcing fibers having the free ends distributed around the periphery of the cylindrical member and attached thereto, means for advancing said member in the general direction of its length relative to the spools for unwinding the warps, means operable during advancement of the member to wind warps of long reinforcing fibers around the first warps to form superposed layers of fibers, said last named means including winders spaced from each other axially of the member and rotatable in opposite directions about the axis of the member to distribute the fibers in the second named warps in oppositely extending spirals around the first mentioned warps, means for applying a thermosetting resin to the warps, means for pressing warps together, and means for curing the resin to integrally secure all the warps together.

7. Apparatus for forming reinforced resin laminates, comprising an elongated cylindrical member, spools containing warps of long glass fibers having the free ends distributed around the cylindrical member and attached to the latter, means for advancing said member in the direction of its length relative to the spools for unwinding the warps, means for winding an additional warp of long glass fibers around the first mentioned warps during advancement of the member, means for applying a resinous binder to the fibers, means for pressing the warps together, and means for curing the binder to integrally secure all the warps together.

8. The method of making a reinforced resin sheet, comprising advancing a protective film of covered cylindrical mandrel in the direction of its axis, applying a heat activatable resin to said mandrel grouping glass fibers of substantial length around the periphery of said mandrel with the fibers extending generally in the direction of length of the mandrel, winding warps of glass fibers in opposite directions around said mandrel to form superposed layers of glass fibers on the mandrel with fibers in said layers extending in different directions, squeezing said superposed layers to impregnate all the fibers with heat activatable resin, and slitting the layers of glass fibers lengthwise of the mandrel to form a sheet.

9. Apparatus for forming a laminable sheet of reinforced plastic, comprising an elongated cylindrical member, spools containing warps of long glass fibers having the free ends distributed around the cylindrical member and attached to the latter, means for advancing said member in the direction of its length relative to the spools for unwinding the warps, means for winding an additional warp of long glass fibers around the first mentioned warps during advancement of the member, means for applying a resinous binder to the fibers, means for pressing the warps together to provide impregnation of and curing the resin to form an exceptionally strong pipe. ting the fibers lengthwise of the cylindrical member to form a sheet thereof.

10. A method of making reinforced resin pipe comprising advancing a mandrel and applying a resin thereto, directing fibers of glass onto the resin-covered mandrel and grouping said fibers so that they extend longitudinally of the mandrel, spirally winding a warp comprising a plurality of side by side, parallel glass fibers bonded together by a resin around the fibers on said mandrel to form superposed layers of fibers with the fibers in adjacent layers extending in different directions, and curing the resin to form an exceptionally strong pipe.

References Cited in the file of this patent

UNITED STATES PATENTS

| | | |
|---|---|---|
| 244,619 | King | July 19, 1881 |
| 1,076,611 | Siegwart | Oct. 21, 1913 |
| 1,274,144 | Dale | July 30, 1918 |
| 1,355,525 | Baker | Oct. 12, 1920 |
| 1,418,906 | Brennan | June 6, 1922 |
| 1,996,951 | Clarke et al. | Apr. 9, 1935 |
| 2,074,580 | Fourness et al. | Mar. 23, 1937 |
| 2,131,024 | Cordts | Sept. 27, 1938 |
| 2,209,547 | Whitacre | July 30, 1940 |
| 2,422,234 | Goldman | June 17, 1947 |
| 2,446,292 | McConnell et al. | Aug. 3, 1948 |
| 2,467,999 | Stephens | Apr. 19, 1949 |
| 2,568,463 | Reynolds | Sept. 18, 1951 |
| 2,573,361 | Rodgers et al. | Oct. 30, 1951 |
| 2,594,693 | Smith | Apr. 29, 1952 |
| 2,609,320 | Modigliani | Sept. 2, 1952 |
| 2,653,887 | Slayter | Sept. 29, 1953 |

FOREIGN PATENTS

| | | |
|---|---|---|
| 627,255 | Great Britain | Aug. 4, 1949 |

OTHER REFERENCES

Howald: "Modern Plastics," February 1946, pages 124 and 125.